(12) United States Patent
Moon

(10) Patent No.: US 6,279,414 B1
(45) Date of Patent: Aug. 28, 2001

(54) MANUAL TYPE TILTING APPARATUS FOR VEHICLE

(75) Inventor: Sung-Jin Moon, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/532,630

(22) Filed: Mar. 22, 2000

(30) Foreign Application Priority Data

Oct. 13, 1999 (KR) .................................................. 99-44366

(51) Int. Cl.[7] ..................................................... B62D 1/18
(52) U.S. Cl. ................. 74/493; 74/541; 280/775
(58) Field of Search ...................... 74/493, 541; 280/775

(56) References Cited

U.S. PATENT DOCUMENTS

| | | | | |
|---|---|---|---|---|
| 2,910,887 | * | 11/1959 | Helms ..................................... | 74/493 |
| 3,807,252 | * | 4/1974 | Parr ......................................... | 74/493 |
| 4,033,158 | * | 7/1977 | Chamberlain et al. ............. | 74/493 X |
| 5,088,342 | * | 2/1992 | Bening et al. ......................... | 74/493 |

* cited by examiner

Primary Examiner—Allan D. Herrmann
(74) Attorney, Agent, or Firm—Christie, Parker & Hale, LLP

(57) ABSTRACT

A manual type tilting apparatus of a vehicle is provided to improve convenience of a driver who can take an action to release the intermeshed state of a movable latch member of an upper steering column and a fixed latch member of a lower steering column and conveniently adjust the slope of the steering axis for a tilting operation while the driver's both hands hold the steering handle at the same time, the apparatus having the upper steering column and the lower steering column coupled at the upper steering column by a pivot point for rotation, a movable latch member with a long hole mounted to rotate at the upper steering column, and a fixed latch member formed at the lower steering column to selectively intermesh with the movable latch member, wherein the movable latch member rotates so as to be detached from the fixed latch member via movable latch member manipulating means eccentrically inserted into the long hole by repeating protrusion and insertion with one touch system, thereby releasing the intermeshed state of the movable latch member and the fixed latch member.

5 Claims, 9 Drawing Sheets

MANUAL TYPE TILTING APPARATUS FOR VEHICLE

BACKGROUND OF THE INVENTION

1. FIELD OF THE INVENTION

The present invention relates to a tilting apparatus of a vehicle, and more particularly to a manual type tilting apparatus of a vehicle that can be conveniently manipulated with a button.

2. BRIEF DESCRIPTION OF THE PRIOR ART

Generally, a steering apparatus of a vehicle is used for changing advancing directions of the vehicle while driving. Such a steering apparatus has a tilting apparatus to provide convenience of a driver by making a vertical change in the slope of a steering shaft suitably for the driver's physical characteristics.

In other words, the conventional manual type tilting apparatus installed at the steering column, as shown in FIG. 1, includes an upper steering column 2 and a lower steering column 3 with accommodation of a steering shaft 1. At this time, the upper steering column 2 has a movable latch member 21 pivotally coupled at one edge by a first hinge point 22 while the lower steering column 3 has a fixed latch member 31 integrally coupled at one edge.

In addition, the lower steering column 3 has a movable member 33 pivotally coupled by a second hinge point 32 for rotating the movable latch member 21 for the tilting operation with a tilt lever 34 being fixed at one end.

Furthermore, the movable member 33 has a pressing surface 33a inwardly hollowed and cut at one pivoting end, while the movable latch member 21 has an externally protruded and fixed pin 21a.

On the other hand, since both edges of a spring 4 are fixed between the pivoting end of the movable member 33 and the upper steering column 2, the spring 4 has elasticity to return to its original state after the movable member 33 is rotated for the tilting operation.

Accordingly, when the driver pulls up (counterclockwise) the tilt lever 34, the movable member 33 of the conventional tilting apparatus thus constructed is rotated counterclockwise at the center of the second hinge point 32 to make the pressing surface 33a push the fixed pin 21a of the movable latch member 21, which is rotated downwards (clockwise) at the center of the first hinge point 22. As a result, the movable member 21 of the upper steering column 22 and the fixed latch member 31 of the lower steering column 3 are unmeshed, the slope of the steering shaft 1 can be controlled by the tilting operation.

When the driver releases the tilt lever 34 that has been rotated counterclockwise after completion of such a tilting operation, the movable member 33 rotates back clockwise by elasticity of the spring 4 to allow the movable latch member 21 to intermesh with the fixed latch member 31. Therefore, the slope of the steering shaft 1 is set as adjusted.

On the other hand, while the tilt lever 34 of the conventional tilting apparatus is rotated by the driver's one hand for the tilting operation, a steering handle should be vertically moved by the driver's other hand. Therefore, there is a problem in the conventional tilting apparatus in that it is tiring and inconvenient for the driver to keep a state in which the tilt lever 34 is pulled up and rotated with one hand for the tilting operation.

SUMMARY OF THE INVENTION

Therefore, it is an object of the present invention to solve the aforementioned problems of the conventional tilting apparatus of a vehicle and provide a manual type tilting apparatus of a vehicle to improve convenience of a driver who can take an action to release the intermeshed state of a movable latch member of an upper steering column and a fixed latch member of a lower steering column and conveniently adjust the slope of a steering axis for a tilting operation while the driver's both hands hold a steering handle at the same time.

In order to accomplish the aforementioned object of the present invention, there is provided a manual type of tilting apparatus for vehicle having an upper steering column and a lower steering column coupled at the upper steering column by a pivot point for rotation, a movable latch member with a long hole mounted to rotate at the upper steering column, and a fixed latch member formed at the lower steering column to selectively intermesh with the movable latch member, wherein the movable latch member rotates so as to be detached from the fixed latch member via movable latch member manipulating means eccentrically inserted into the long hole by repeating protrusion and insertion with one touch system, thereby releasing the intermeshed state of the movable latch member and the fixed latch member.

In addition, the movable latch member manipulating means comprises:

a housing fixed at the upper steering column;

an shaft member accommodated for elastic protrusion and insertion in the housing;

a manipulating tool for making it possible to get the shaft member protruded and inserted with one touch system;

a manipulating knob for transmitting manipulating force to the manipulating tool; and a protruded piece formed with a slant surface at one edge of the shaft member.

BRIEF DESCRIPTION OF THE DRAWINGS

Objects and aspects of the invention will become apparent from the following description of an embodiment with reference to the accompanying drawings in which.

DETAILED DESCRIPTION OF THE INVENTION

Now, an embodiment of the present invention will be described in detail with reference to accompanying drawings.

Figure 1:
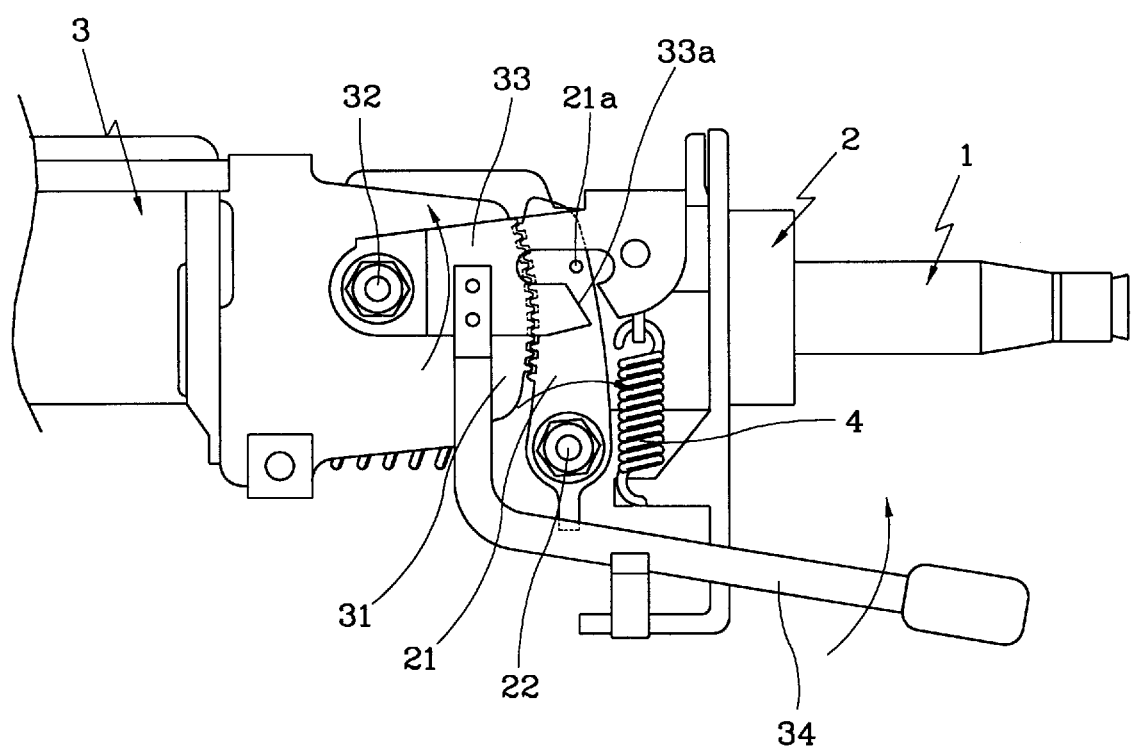
FIG. 1 is a structural view for illustrating a manual tilting apparatus constructed on a steering axis of a conventional vehicle.
Figure 2:
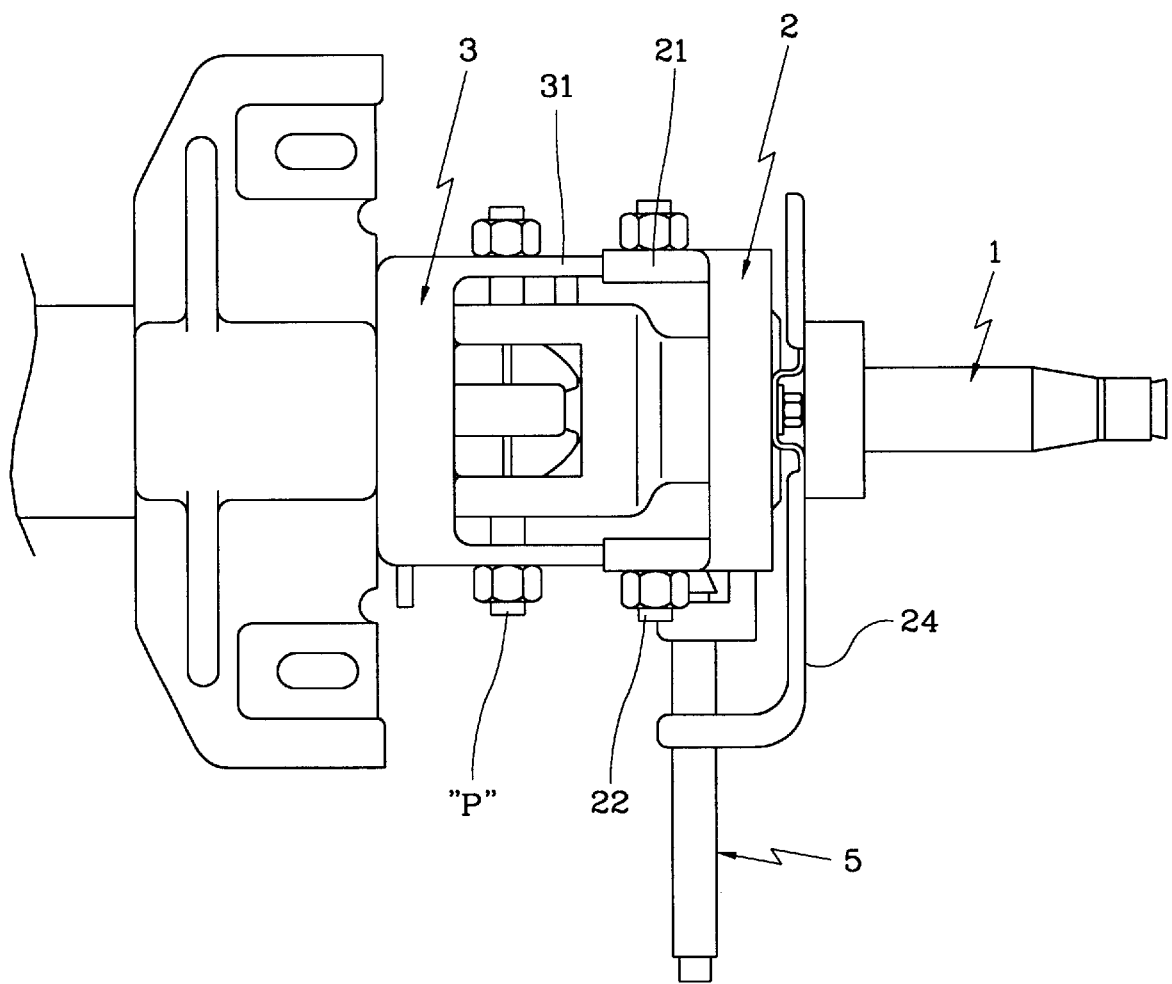
FIG. 2 is a plan view for illustrating a tilting apparatus of the present invention.
Figure 3:
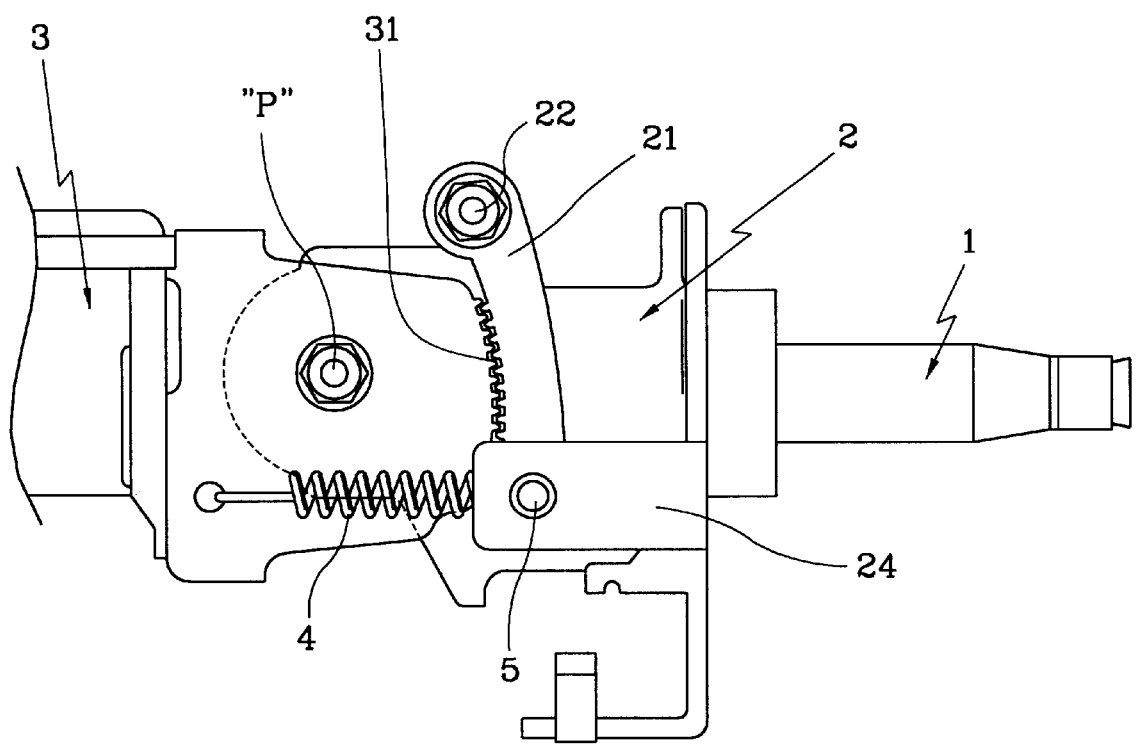
FIG. 3 is a lateral view for illustrating a tilting apparatus of the present invention.

FIG. 2 is a plan view for illustrating a tilting apparatus of the present invention. FIG. 3 is a lateral view of a tilt apparatus in accordance with the present invention. At this time, identical reference numerals are used for the same parts of the conventional manual type tilting apparatus of a vehicle shown in FIG. 1, and detailed explanations therefor will be omitted.

As shown in the accompanying drawings, the tilting apparatus of the present invention includes an upper steering column 2 and a lower steering column 3 with accommodation of a steering shaft 1 intermeshed respectively by movable and fixed latch members 21, 31 for selectively controlling the slope of the steering shaft 1, and coupled by a pivot point (P), wherein the movable latch member 21 is coupled by a hinge point 22 at one edge of the upper steering column 2 for pivot, while the fixed latch member 31 is integrally formed at one edge of the lower steering column 3.

Figure 4:
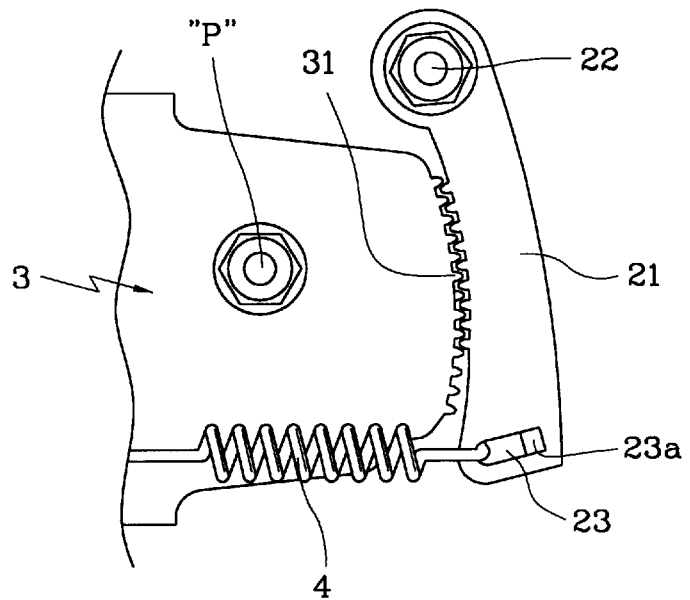
FIG. 4 is a lateral view for illustrating movable and fixed latch members shown in FIG. 3.

Furthermore, as shown in FIG. 4, a long hole 23 is formed at one edge of a pivoting part of the movable latch member 21, and a spring 4 is inserted between the long hole 23 and a predetermined portion of the lower steering column 3 for applying elasticity to the movable latch member 21 for a tilting operation. In addition, a slant surface 23a is integrally formed at one side of the long hole 23.

On the other hand, movable latch member manipulating means 5 is installed at the upper steering column 2 for selectively releasing an intermeshed state between the movable and fixed latch members 21, 31. At this time, the movable latch member manipulating means 5 is made to repeat protrusion and insertion with one touch type button system.

Figure 5:
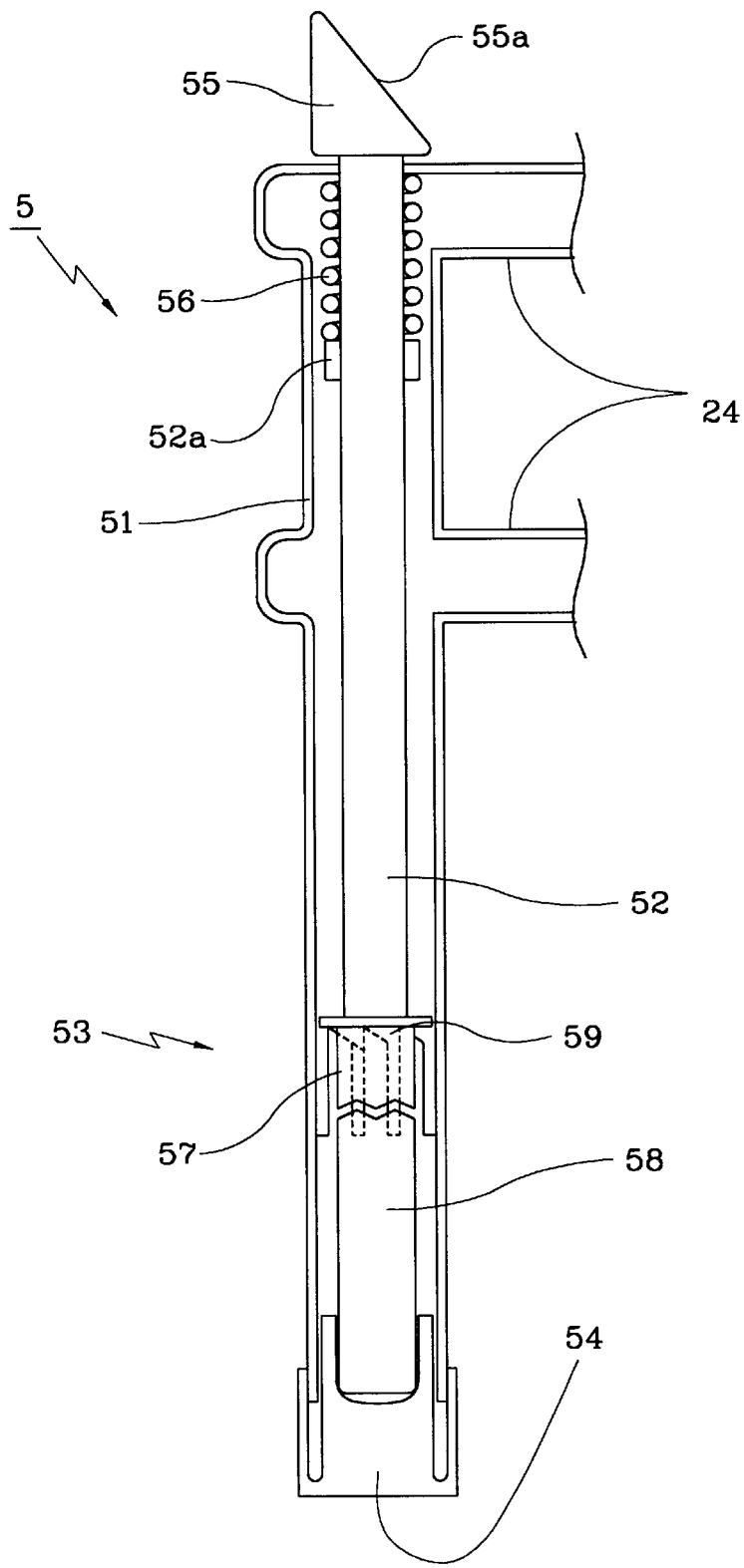
FIG. 5 is an enlarged partial cross-sectional view of FIGS. 2 and 3.

In other words, the movable latch member manipulating means 5, as shown in FIG. 5, includes a housing 51 fixed by a mounting bracket 24 at the upper steering column 2, an shaft member 52 accommodated for elastic protrusion and insertion in the housing 51, a manipulating tool 53 for enabling the shaft member to be selectively protruded and inserted with one touch type button system, and a manipulating knob 54 for transmitting its manipulating force to the manipulating tool 53.

Furthermore, the shaft member 52 is fixedly disposed at one side thereof with a wedge-shaped protruded piece 55 having a slant surface 55a formed with a slant toward one direction. Between an inner portion of the housing 51 and a peripheral surface of the shaft member 52, there is provided a spring 56. The spring 56 is supported at one side thereof by an inner side surface of the housing 51 and supported at the other side thereof by a protruded part 52a formed at the shaft member 52.

Figure 6:
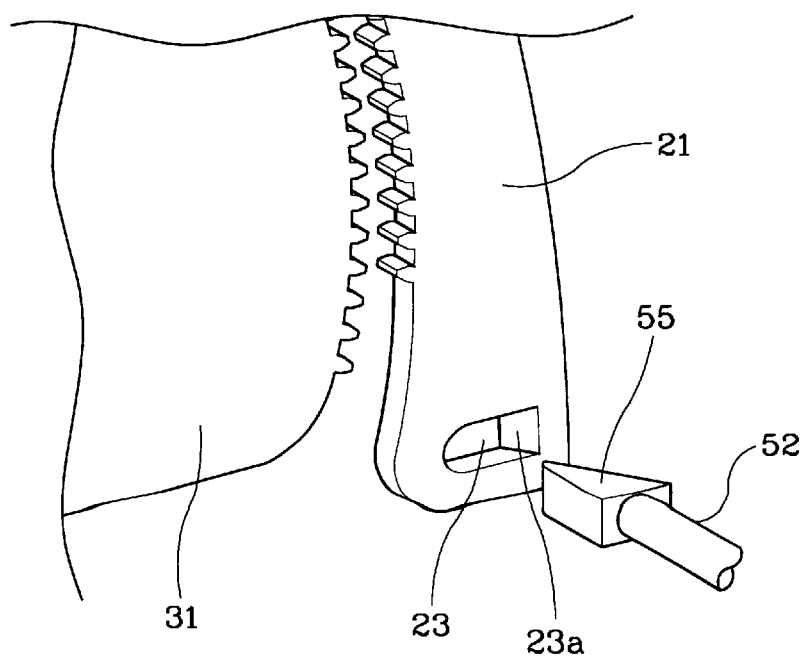
FIGS. 6 and 7 are respectively perspective view and plan cross-sectional view for illustrating a state where a protruded piece of an shaft member is inserted to a movable latch member.
Figure 7:
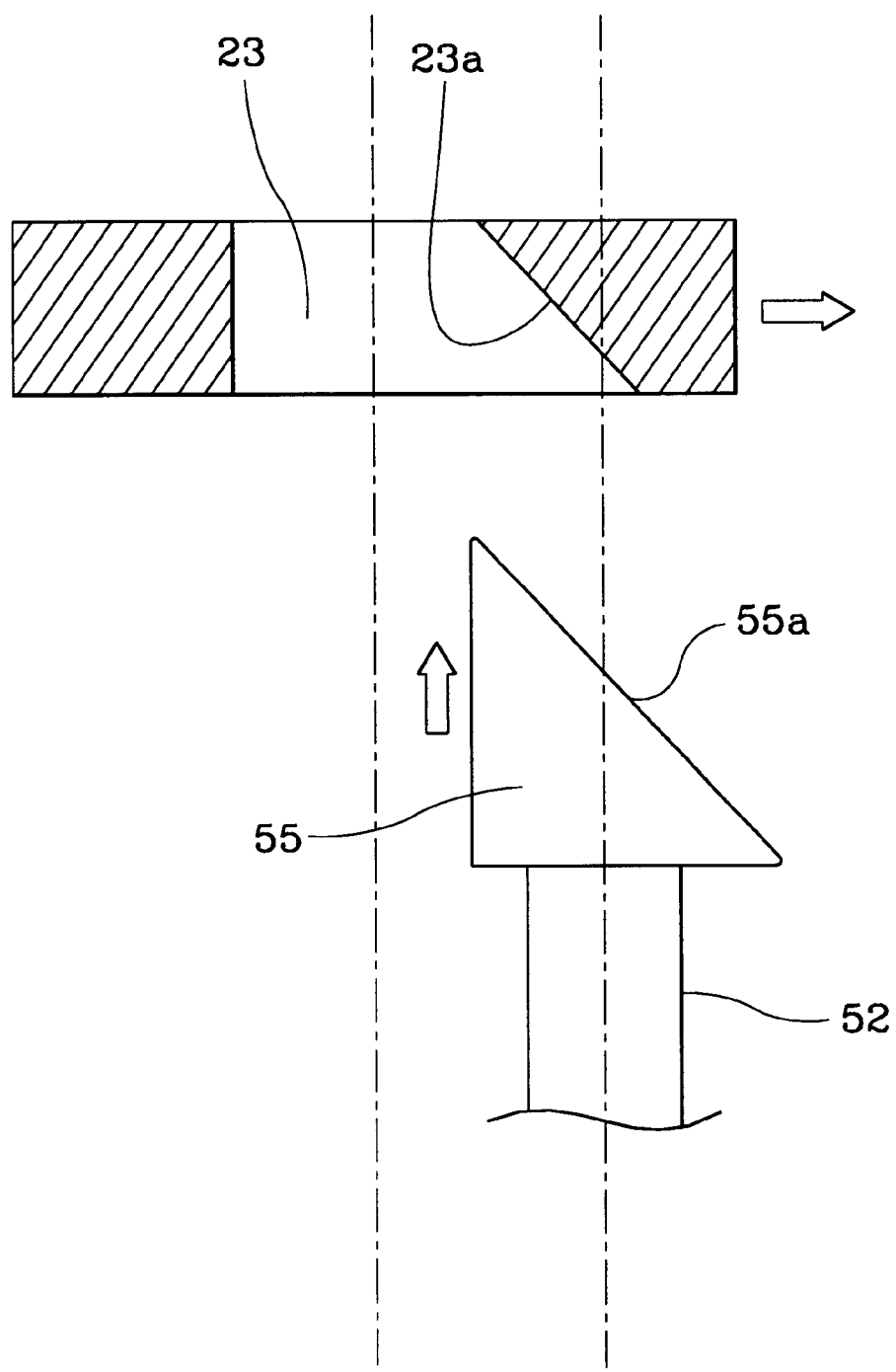

In addition, as shown in FIGS. 6 and 7, the movable latch member manipulating means 5 having a wedge type of a protruded piece 55 fixed at one edge of the shaft member 52 with a slant surface 55a is directed to the long hole 23 of the movable latch member 21. The center of the long hole 23 of the movable latch member 21 is eccentrically positioned from that of the shaft member 52.

Accordingly, when the protruded piece 55 of the movable latch member manipulating means 5 advances to the movable latch member 21, the slant surface 55a of the protruded piece 55 touches the slant surface 23a formed at the one side of the long hole 23 of the movable latch member 21 and pushes the long hole 23 to a side. As a result, the movable latch member 21 is pivoted counterclockwise at the center of the hinge point 22 to release the intermeshed state between the movable latch member and the fixed latch member 31.

Figure 8:
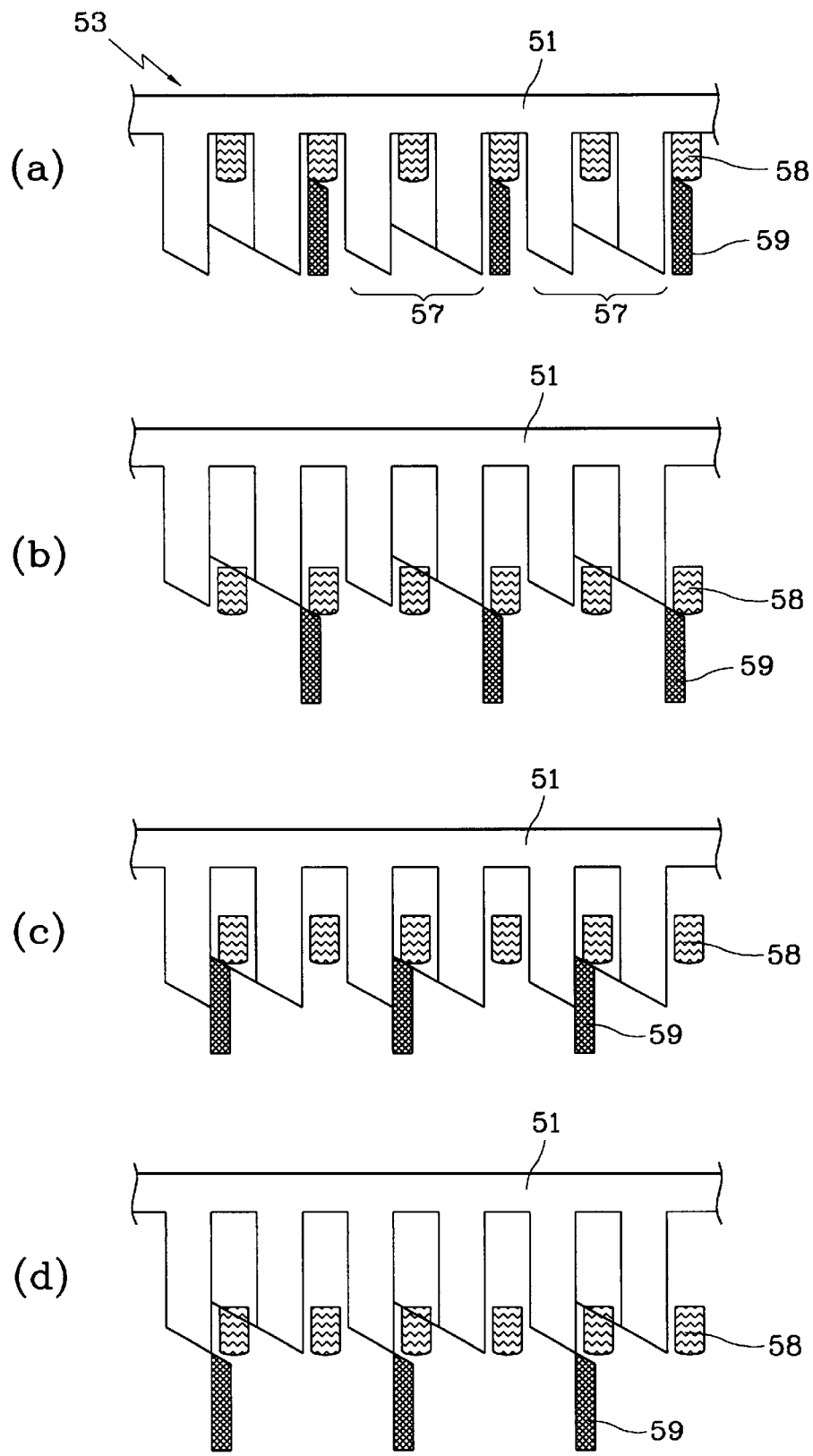
FIGS. 8 (a), (b), (c) and (d) are sequential operational views of manipulating means shown in FIG. 5.

On the other hand, the manipulating tool 53 of the movable latch member manipulating means 5 is a widely known part for operating the manipulating knob with one touch system 54 to enable the shaft member 52 to be protruded or inserted at the housing 51. The structure and operations of the manipulating tool 53 are illustrated in FIGS. 8 (a), (b), (c) and (d).

In other words, the manipulating tool 53 includes guide parts 57 protruded at the internal periphery side with different edge lengths, a first movable member 58 with one side thereof being coupled with the manipulating knob 54 and the other side thereof extended in length and intermeshed into the guide part 57 and a second movable member 59 arranged between the first movable member 58 and the shaft member 52 for transmitting the force applied from the first movable member 58 to the shaft member 52.

At this time, the first movable member 58 is fixed at the manipulating knob 54 for vertically performing linear movements in accordance with pressure of the manipulating knob 54, while the second movable member 59 is arranged between the first movable member 58 and the shaft member 52 without restraint of the shaft member 52. Therefore, when the second movable member 59 performs reciprocal movements with transmission of vertically moving force applied by the pressure of the manipulating knob 54 from the first movable member 58, it repeats the vertical movements and rotations with the help of the slant edge having different lengths of the guide part 57.

Accordingly, whenever the manipulating knob 54 of the movable latch member manipulating means 5 is pressed, the first movable member 58 coupled at one edge of the manipulating knob 54 pushes via the second movable member 59 the shaft member 52 elastically supported by the spring 56 in the housing 51. At this time, the second movable member 59 is accommodated to the slant edge of the guide part 57 having different lengths, changing positions to which the shaft member 52 is to be fixed. Therefore, there will be variations in the distance between the upper edge of the shaft member 52 and the housing 51.

On the other hand, whenever the manipulating knob 54 is pressed at the movable latch member manipulating means 5, the guide parts 57 formed at the internal periphery surface of the housing 51 enable the first and second movable members 58, 59 to respectively repeat their vertical movements therein.

Therefore, if the driver presses the manipulating knob 54 of the movable latch member manipulating means 5 with his one hand once to adjust the slope of the upper steering column 2, the shaft member 52 of the movable latch member manipulating means 5 is exposed out of the housing 51 and the slant surface 55a of the protruded piece 55 mounted on the edge of the shaft member 52 touches the slant surface 23a formed at the side of the long hole 23 of the movable latch member 21 to push the long hole 23, thereby rotating the movable latch member 21 counterclockwise. In consequence, the movable latch member 21 is set apart from the fixed latch member 31, releasing their intermeshed state, so that the upper steering column 2 can freely rotate via the pivot point (P) apart from the lower steering column 3.

Then, the driver holds the steering handle mounted on the upper steering column 2 with both hands to properly tilt the upper steering column 2 at his own angle and presses the manipulating knob 54 of the movable latch member manipulating means 5, the protruded piece 55 that pushes the hollow 23 of the movable latch member 21 returns to the housing 51. At this time, the movable latch member 21 rotated counterclockwise and detached from the fixed latch member 31 is to be intermeshed with the fixed latch member 31 by elasticity of the spring 4, so that the slope of the upper steering column 2 is kept at its fixed state.

Figure 9:
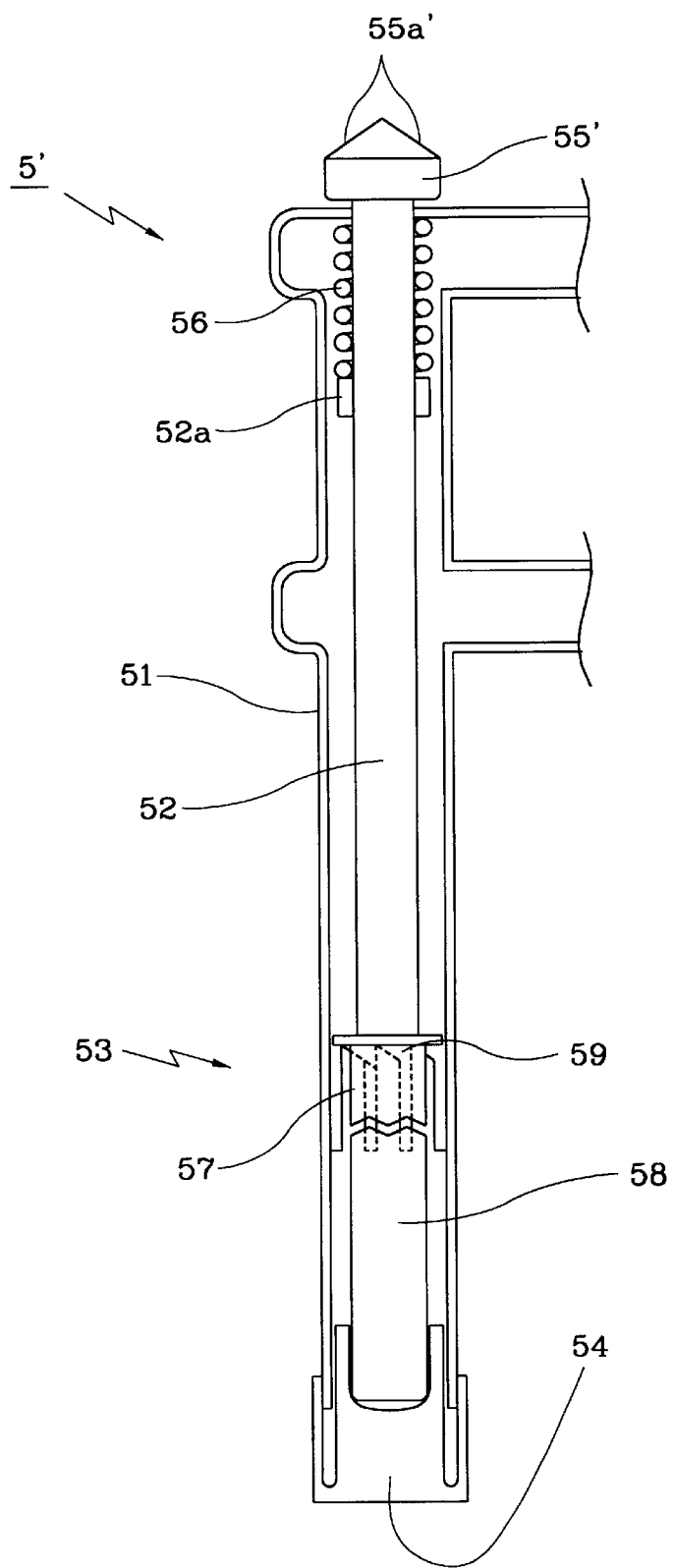
FIGS. 9 through 11 are views for illustrating another embodiment of the present invention respectively corresponding to FIGS. 5, 4 and 7.

On the other hand, similarly to the movable latch member 5, the movable latch member manipulating means 5' according to the another embodiment, as shown in FIG. 9, includes a housing 51 fixed at the upper steering column 2, an shaft member 52 accommodated for elastic protrusion and insertion in the housing 51, a manipulating tool 53 for making it possible to get the shaft member 52 selectively protruded and inserted with one touch type button system, and a manipulating knob 54 for transmitting manipulating force to the manipulating tool 53.

In addition, the movable latch member manipulating means 5' having a conical shape of a protruded piece 55 fixed at one edge of the shaft member 52 with slant surfaces 55a at both directions and a spring 56 inserted between the housing 51 and the shaft member 52. At this time, the spring 56 is supported between the internal side of the housing 51 and the protruded part 52a formed at the shaft member 52.

In addition, the long hole formed at the movable latch member 21 is made without a slant surface.

Figure 10:
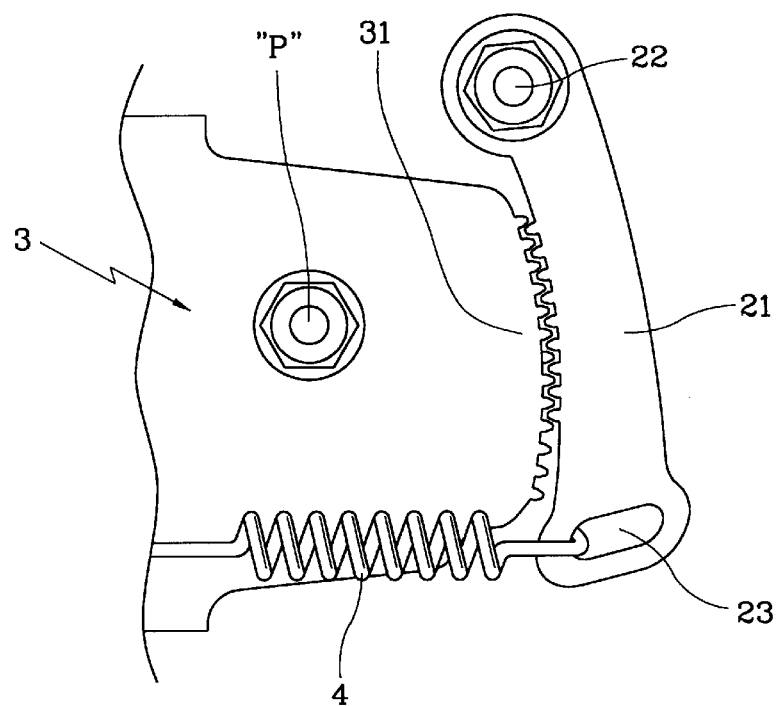
Figure 11:
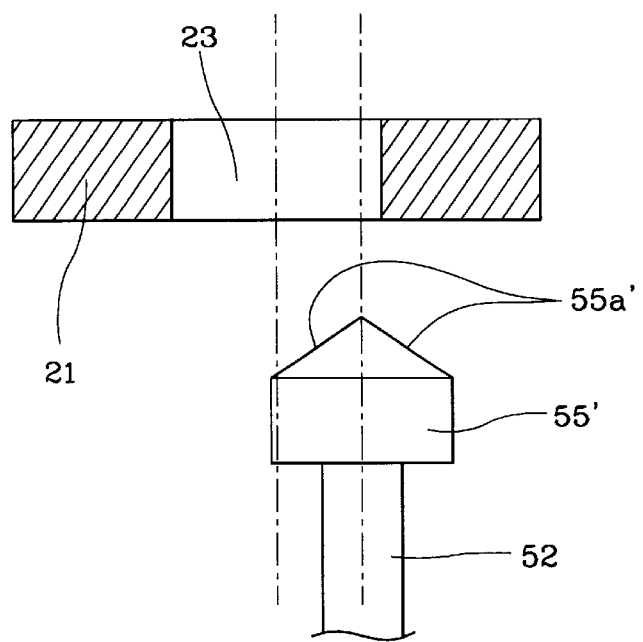

Furthermore, as shown in FIGS. 10 and 11, the wedge type of the protruded piece 55' mounted at one edge of the shaft member 52 of the movable latch member manipulating means 5' with a slant surface 55a' is arranged to the long hole 23 of the movable latch member 21, wherein the center of the long hole 23 of the movable latch member 21 is eccentrically positioned from that of the shaft member 52.

Accordingly, when the protruded piece 55' of the movable latch member manipulating means 5' advances to the movable latch member 21, the slant surface 55a' of the protruded piece 55' touches the long hole 23 of the movable latch member 21 and pushes the long hole 23 to a side. As a result, the movable latch member 21 is rotated counterclockwise at the center of the hinge point 22 to release the intermeshed state of the movable latch member 21 apart from the fixed latch member 31, thereby making it possible to completely perform the tilting operation.

As described above, there are advantages in the manual type tilting apparatus of a vehicle of the present invention in that the movable latch member 21 is rotated by the one touch type of the movable latch member manipulating means 5 to release the state of the movable latch member 21 and the fixed latch member 31 intermeshed on the upper and lower steering columns 2, 3, thereby making it possible for the driver to use both hands for controlling the slope of the steering handle at the same time, additionally for old or woman drivers to conveniently performing the tilting operation.

What is claimed is:

1. A manual type tilting apparatus for vehicle having an upper steering column and a lower steering column coupled at the upper steering column by a pivot point for rotation, the apparatus comprising: a movable latch member with a long hole mounted to rotate at the upper steering column; and a fixed latch member formed at the lower steering column to selectively intermesh with the movable latch member, wherein the movable latch member rotates so as to be detached from the fixed latch member via movable latch member manipulating means eccentrically inserted into the long hole by repeating protrusion and insertion with one touch system, thereby releasing the intermeshed state of the movable latch member and the fixed latch member.

2. The apparatus, as defined in claim 1, wherein the movable latch member manipulating means comprises:
   a housing fixed at the upper steering column;
   an shaft member accommodated for elastic protrusion and insertion in the housing;
   a manipulating tool for making it possible to get the shaft member protruded and inserted with one touch system;
   a manipulating knob for transmitting manipulating force to the manipulating tool; and
   a protruded piece formed with a slant surface at one edge of the shaft member.

3. The apparatus, as defined in claim 2, wherein the movable latch member is supported by a spring to the fixed latch member and the shaft member is elastically supported by a spring inserted between an internal lateral surface of the housing and a protruded part thereof.

4. The apparatus, as defined in claim 2, wherein slant surfaces are formed respectively at one side of the long hole and at one side of the protruded piece, and a center of the long hole is eccentrically positioned from that of the protruded piece.

5. The apparatus, as defined in claim 4, wherein the protruded piece is formed in a conical shape with its center being eccentrically positioned from that of the long hole.

* * * * *